United States Patent Office 2,715,149
Patented Aug. 9, 1955

2,715,149

ELECTRIC STORAGE BATTERY

John H. Joynt, Alexandria, Va., assignor to The Electro-acid Corporation, a corporation of Texas No Drawing. Application April 29, 1953,
Serial No. 352,037

8 Claims. (Cl. 136—26)

My invention relates to electric storage batteries, and more specifically concerns a storage battery of the lead-sulphuric acid type.

Among the objects of the invention is to provide an electric storage battery of the type described wherein detrimental sulphation is minimized and wherein rate of both charge and discharge are increased without harmful effect; which will permit long storage of the battery even with the battery plates in dry condition, thus facilitating ready shipping; which will retain charge without appreciable loss during long standing idle and will not be damaged upon long standing in discharged condition, and which, with the addition of improved electrolyte, permits more rapid exchange of ions into and out of the battery plates without damage to the plate structure and long useful life is achieved with minimum cost when viewed from "total-life" aspect.

Other objects of my invention in part will be obvious and in part more fully pointed out hereinafter during the course of the following description.

Accordingly, my invention may be considered as residing in the several arrangements of parts, compositions of materials, and in the relation and combination of each of the same with one or more of the others, the scope of the application of all of which is more fully set forth in the accompanying claims.

To better understand my invention, it may be noted at this point that the common lead-sulphuric acid type of electric storage battery unfortunately is characterized by the phenomenon that the electrolyte commonly employed therein—dilute sulphuric acid—indirectly destroys the plates thereof. Moreover, it importantly limits the maximum rates at which the batery can be charged and discharged without damage. Any important increase in rate of either charge or discharge of the conventional battery, beyond the rather low rates commonly imposed, will almost inevitably result in either total destruction of the battery, or at least serious damage thereto attended by a marked shortening of its useful life.

The ordinary storage battery of the type described comprises a number of cells, each cell being made up of a plurality of plates alternately of sponge lead and lead oxide as the active constituents, the battery casing being filled with dilute sulphuric acid which when initially introduced and under full charge conditions has a specific gravity of about 1.275. When fully discharged the electrolyte is water with specific gravity 1.000. With full discharge the active materials of the plates have become essentially lead sulphate.

A battery that is permitted to stand idle in the discharged condition is subject to what is commonly termed sulphation. With the cycles of heating and cooling encountered in day to day atmospheric temperature changes the fine sulphate crystals are taken into solution, although the solubility of lead sulphate in water is very low, indeed, as the temperature increases and the dissolved sulphate precipitates out as the temperature falls. In coming out of the solution the lead sulphate deposits on existing crystals thus making them larger. With long idle standing where the temperature changes are met with, the larger crystals grow at the expense of the smaller ones. As a result, the lead sulphate becomes hard and compact. Porosity of the plates is decreased and so is the total surface area.

Sulphation is undesirable in that it slows up the current producing functions of the battery. As well, by obstructing the movement of the electrolyte into and out of combination with the material of the plates, it slows up the rate of charging. The retarding action thus imparted effectively prevents charging the usual battery at a rate appreciably in excess of sixty amperes per cell. As well, discharge in excess of that rate is most undesirable, as has been suggested, for violation of that rule of thumb almost inevitably is accompanied by serious damage to the plates, either by buckling or by loss of material therefrom.

Although many attempts have been made to provide batteries which display greater useful life while being subjected to accelerated charging and discharging conditions, and while attempts have been made to minimize excessive sulphation of the plates during use, for one reason or another most of these efforts have fallen short of success. And heretofore it has been virtually impossible, from a practical standpoint, to increase appreciably the rate of charge or of discharge without attendant damage to the battery.

An object of my invention, therefore, is to provide an electric storage battery having long useful life, which can be readily and rapidly charged and discharged at extremely high current rates without detrimental effect; which will retain its useful characteristics, even when idle over long periods of time; which can be transported readily and cheaply and even stored in dry condition; and which in short is rugged and efficient and yet which is comparatively inexpensive in initial construction, in storage preparatory to use, and in active operation and maintenance.

Referring now to the practice of my invention, I employ a battery casing of the usual acid resistant material, and having conventional configuration. In this casing I provide at least one plate, with active ingredients essentially formed of lead dioxide, serving as the positive pole of the battery and at least one plate, with active ingredients essentially comprising pure sponge lead, serving as the negative pole.

Typically an electrolyte suitable for my purpose comprises: Sulphuric acid ($H_2SO_4$) 1/3 by volume and distilled water ($H_2O$) 2/3 by volume. To this there is added a suitable and soluble germanium compound. This preferably is selected from the group comprising the bromide, the dichloride, the tetrachloride, the fluoride, the iodide, the monoxide and dioxide and the oxychloride.

To each 100 gallons of the aqueous solution of sulphuric acid I add approximately one (1) pound of a suitable water-soluble germanium-containing compound from the group noted. It will be observed that generally, the proportion by weight of the addition is of the order of 0.1%.

With the foregoing electrolyte in the battery case in which the lead dioxide plate or plates and the sponge lead plate or plates have been positioned, I first subject the battery to charging in the usual manner. I find, however, that with my new electrolyte charging currents as high as 100 amperes per cell may be employed with absolutely no evidence of damage to the battery elements. And this is so, even when these latter are subjected to the most exhaustive tests. More particularly, it may be noted that although I do not pretend to know conclusively the exact nature of the chemical and electro-chemical reactions involved incident to the charging and discharging, I find that a battery construction according to the practice of my invention can be safely subjected to a charging rate of more than 100 amperes per cell for several hours without detrimental or excessive heating and without damage to the plates. This appreciably lowers the cost of initial activation of the batteries during manufacture. By contrast, it may be noted that such operational technique would almost inevitably bring about destruction of a similar battery using only the usual sulphuric acid electrolyte. My battery is equally adapted to discharge at similar high current densities.

In the manufacture of the conventional battery the plates are positioned in the battery case, the case is then filled with the aqueous sulphuric acid electrolyte, and the battery is then charged. Because of local action in the battery, which takes the effect of discharging it somewhat, and sulphation as previously dealt with, rapid deterioration is encountered if the battery is not thereafter maintained in fully charged condition. This means that the manufacturer must maintain the battery supplied with electrolyte and must keep the battery charged by occasional recharging until sold. Shipment of these batteries is costly due to weight of electrolyte. Moreover, such shipment is relatively hazardous, due to likelihood of breakage or spillage, with attendant and consequent damage to other shipments. Dry shipment is fraught with difficulty because it entails a special steam treatment of the plates to clean them and because, even then, the plates are inclined to sulphate in transit and in dry storage.

As contrasted with the conventional battery, my battery may be subjected to an initial charge with the plates immersed in a dilute aqueous sulphuric acid solution, this at low charging rate. This first solution is then discarded, my new electrolyte is added, and the battery is charged at high current rate, say 100 amperes per cell, for about three and one-half hours in a typical instance. Following the completion of the charge, the battery is put on discharge and after full discharge the plates thereafter may be removed from the electrolyte, washed and dried.

In order to make the battery ready for use, it merely is necessary to place the plates in a battery case, add distilled water and charge it. A fully charged battery is thereby produced. The dry plates, either within or without the battery case, are not given to taking on moisture from the air. For some reason as yet unknown to me, the plates no longer are hygroscopic. The dry plates, while containing the components which, when placed in solution with and upon addition of water, will produce the acid electrolyte at proper strength, may nevertheless be handled freely and with the utmost safety by the bare hand while the plates are in dry condition. These plates feel rather glassy and not at all like the conventional untreated plates.

Where desired, the battery may be shipped in dry condition, and this with reduced cost and increased safety. It is equally feasible to ship the treated plates alone while in dry condition. And this presents further savings in transportation costs, and with like increase in the safety potential. Upon adding distilled water to the dry battery just prior to use and charging the battery is ready. Once the battery is formed and charged, this charge will endure without substantial loss in effectiveness.

It is possible to vary the proportion of the soluble germanium-containing additive to the electrolyte, depending not only upon the particular germanium compound used but also ranging between certain permissible limits for the particular germanium compound employed. Thus the proportion of germanium compound to be added to the electrolyte may be varied between say, about 0.05% and 0.2% or higher by weight. A concentration of about 0.1% by weight gives satisfactory results, however.

As suggested at an earlier point herein a further important advantage of my invention is the fact that the voltage per cell is somewhat increased. This is attributed, at least in part, to the fact that the objectionable growth of lead sulphate crystals during idle periods is materially lessened in the new battery. The absence of sulphate lessens ohmic resistance. As a result, the terminal voltage for each cell is somewhat increased.

I have not conclusively established as yet, however, whether the increased voltage is due in fact to decreased electrical resistance as suggested, or whether it results from increased flow of electrons attendant in some manner upon the addition to the electrolyte of the acid-soluble germanium-containing compound. It remains, however, and regardless of the exact reason, that when my new battery is placed into service the characteristic advantages which have been recited are achieved; namely, ability to withstand effectively abnormally high rates of charging and discharging, ability to retain its charge without necessity for constantly replenishing the charge, and important savings in shipping costs with increased safety to other merchandise undergoing shipping.

It should be observed that while the mode of adding the soluble germanium compound to the battery which at present I find to be most practicable is through the electrolyte, it is entirely within the realm of possibility to accomplish this in other manners. For illustratively, it may be applied as a coating to the interior walls of the casing; or to the surfaces of the battery plates. Or it may be mixed into the plate material, particularly the lead peroxide plate.

It is my belief that in actual practice the germanium ionizes out of solution and deposits onto the battery plates in an extremely thin, uniform layer, possibly as germanium sulphate. In so doing it apparently penetrates into the very pores of the plates. Thereby it effectively shields the discrete particles of active ingredients making up the plates against sulphation. Moreover, it lends physical strength to the active ingredients, while in no sense interfering with or preventing proper charge and discharge. In some measure it may even enshroud impurities found in the plates.

Regardless of theory, however, a battery produced according to the practice of my invention is extremely rugged and withstands both charging and discharging at extremely high current rates. The new electrolyte makes the resultant battery exceptionally resistant to shock and vibration and imparts long useful life thereto.

It will be apparent from the foregoing that while I have described herein certain manners of carrying my invention into execution, these are purely illustrative. No implication results therefrom that the invention is to be limited to the exact form thus disclosed. It is to be understood that my invention is intended to cover all modifications of the disclosed embodiments as properly fall within the scope of the claims which follow.

I claim as my invention:

1. An electrolyte for a storage battery comprising dilute sulphuric acid in the approximate proportions by volume of one-third shulphuric acid and two-thirds water, together with a water-soluble germanium-containing compound present in the approximate percentage by weight ranging from about 0.05% to about 0.2%.

2. A storage battery electrolyte comprised of dilute sulphuric acid in the proportions by volume of about one-third sulphuric acid and two-thirds water, and a small quantity of a water-soluble germanium compound selected from the group consisting of bromide, dichloride, tetrachloride, fluoride, iodide, monoxide, dioxide and oxychloride in amount sufficient to prevent objectionable sulphation.

3. A storage battery comprising a casing, at least one each of a sponge lead plate and a lead dioxide plate, sulphuric acid electrolyte essentially consisting of about one-third sulphuric acid and two-thirds water by volume, and an agent coated on said plates comprising an initially water-soluble germanium compound in amount sufficient to prevent objectionable sulphation.

4. As elements of a storage battery, a casing and housed therein in alternating sequence, dried plates of pure sponge lead and lead dioxide, which plates are supplied with a coating of germanium compound by prior electrolytic action in amount sufficient to prevent objectionable sulphation.

5. A storage battery comprising a casing, alternate plates of pure sponge lead and lead dioxide, and an electrolyte comprised of dilute sulphuric acid in the proportions by volume of about one-third sulphuric acid and two-thirds water, and a small amount of water-soluble germanium-containing compound selected from the group consisting of bromide, dichloride, tetrachloride, fluoride, iodide, monoxide, dioxide and oxychloride in amount sufficient to prevent objectionable sulphation.

6. A storage battery comprising a casing, alternating plates therein of pure sponge lead and lead dioxide, and an electrolyte comprising an aqueous solution of sulphuric acid in which the sulphuric acid is present in the approximate proportion of one-third by volume, together with from about 0.05% to 0.2% by weight of soluble germanium compound.

7. In a method of manufacturing an electric storage battery for shipment in dry condition, the art which comprises immersing sponge lead plates and lead dioxide plates in an electrolyte essentially containing aqueous sulphuric acid and about 0.05% to 0.2% germanium compound dissolved therein, charging the same, then discharging the same, removing the plates from the electrolyte and drying the same, and assembling the dried plates in a battery case.

8. In a method of manufacturing electric storage battery plates, the art which comprises immersing sponge lead plates and lead dioxide plates in an electrolyte essentially containing aqueous sulphuric acid and about 0.05% to 0.2% germanium compound dissolved therein, charging the same, then discharging the same, and removing the plates from the electrolyte and drying the same.

References Cited in the file of this patent

UNITED STATES PATENTS 2,649,766    Johnson _____ Aug. 25, 1953

FOREIGN PATENTS 17,674    Great Britain _____ of 1905

OTHER REFERENCES

Dept. of Commerce, Nat'l Bureau of Standards, Letter Circular, LC302, May 15, 1931, pp. 1–4.

Storage Batteries, 3rd edition, by Vinal, 1940, pp. 24–35, 118, 119, 140, 141, and 307–311.